United States Patent
Song et al.

(10) Patent No.: US 11,584,180 B2
(45) Date of Patent: Feb. 21, 2023

(54) STRUT BEARING ASSEMBLY FOR VEHICLE AND MANUFACTURING METHOD THEREOF

(71) Applicants: HYUNDAI MOBIS CO., LTD., Seoul (KR); ILJIN CO., LTD., Gyeongju-si (KR)

(72) Inventors: Min Soo Song, Yongin-si (KR); Byung Hwan Kim, Seoul (KR); Tae Ho Hong, Seoul (KR)

(73) Assignees: HYUNDAI MOBIS CO., LTD., Seoul (KR); ILJIN CO., LTD., Gyeongju-si (KR)

( * ) Notice: Subject to any disclaimer, the term of this patent is extended or adjusted under 35 U.S.C. 154(b) by 0 days.

(21) Appl. No.: 17/475,798

(22) Filed: Sep. 15, 2021

(65) Prior Publication Data

US 2022/0080798 A1 Mar. 17, 2022

(30) Foreign Application Priority Data

Sep. 16, 2020 (KR) .................. 10-2020-0119135

(51) Int. Cl.
  *B29C 65/00* (2006.01)
  *B29C 65/18* (2006.01)
  *B60G 15/06* (2006.01)

(52) U.S. Cl.
  CPC ............ *B60G 15/068* (2013.01); *B29C 65/18* (2013.01); *B60G 2204/128* (2013.01); *B60G 2204/418* (2013.01)

(58) Field of Classification Search
  CPC ... B29C 65/18; B29C 65/606; B29C 66/0242; B29C 66/21; B29C 66/3494; B29C 66/54; B29C 66/7392; B29C 66/8322; B60G 15/067; B60G 15/068; B60G 2204/128; B60G 2204/41; B60G 2204/418; B60G 2206/7104; B60G 2206/722; B60G 2206/81012; B60G 2206/82; B60G 2206/8209; B60G 2206/91; F16C 2226/36; F16C 2326/05; F16C 33/723
  See application file for complete search history.

(56) References Cited

U.S. PATENT DOCUMENTS

| | | | |
|---|---|---|---|
| 2016/0089947 A1* | 3/2016 | Bedeau | B60G 15/068 248/634 |
| 2016/0221409 A1* | 8/2016 | Jang | F16C 35/067 |
| 2016/0223023 A1* | 8/2016 | Lee | F16C 19/163 |
| 2016/0304130 A1* | 10/2016 | Shin | B60G 15/068 |
| 2020/0406515 A1* | 12/2020 | Lim | B60G 15/04 |

FOREIGN PATENT DOCUMENTS

KR   10-1479594 B1   1/2015

* cited by examiner

*Primary Examiner* — Karen Beck
*Assistant Examiner* — Daniel M. Keck
(74) *Attorney, Agent, or Firm* — NSIP Law

(57) ABSTRACT

A strut bearing assembly for a vehicle includes: an insulator coupled to a vehicle body; a first case disposed to face the insulator; a second case rotatably coupled to the first case; a friction reduction unit disposed between the first case and the second case, and configured to reduce friction between the first case and the second case; and a coupling unit disposed in the insulator and the first case, melted by heat, and coupling the insulator and the first case to each other.

14 Claims, 11 Drawing Sheets

S300

STRUT BEARING ASSEMBLY FOR VEHICLE AND MANUFACTURING METHOD THEREOF

CROSS-REFERENCE TO RELATED APPLICATIONS

This application claims the benefit under 35 U.S.C. § 119(a) of Korean Patent Application No. 10-2020-0119135 filed on Sep. 16, 2020 in the Korean Intellectual Property Office, the entire disclosure of which is incorporated herein by reference for all purposes.

BACKGROUND

Field

Exemplary embodiments of the present disclosure relate to a strut bearing assembly for a vehicle and a manufacturing method thereof, and more particularly, to a strut bearing assembly for a vehicle using hot melt molding and a manufacturing method thereof.

Discussion of the Background

In general, a vehicle suspension is a device for substantially preventing damage to a vehicle body or cargo and improving ride comfort by connecting an axle and the vehicle body and substantially preventing vibration and shock, which are received by the axle from a road surface, from being directly transmitted to the vehicle body when a vehicle is running.

Such a suspension is variously classified according to a coupling method with the vehicle body, a vibration control method, and the like. As a front suspension, there are a wishbone type and a Macpherson type. The Macpherson type is widely used in passenger cars and the like because of a simpler structure and superior ride comfort compared to the wishbone type.

Such a Macpherson type suspension has a structure in which there is no upper arm, and instead, a lower end of a strut including a shock absorber is integrally connected to a lower arm through a steering knuckle, and the steering knuckle and the strut are integrally rotated during steering. In order for the strut to be able to rotate integrally with the steering knuckle, an upper part of the strut is installed to be rotatable relatively to the vehicle body or a chassis frame via a strut bearing.

However, the strut bearing in the related art is press-fitted to a lower part of an insulator. The strut bearing may cause assembly failure due to a misalignment in the case of a loose fitting dimension according to inner and outer diameters thereof, and may be broken to cause quality problems in the case of a press-fitting dimension.

The background art of the present disclosure is disclosed in Korean Patent No. 10-1479594 (registered on Dec. 30, 2014 and entitled "Insulator of Suspension").

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a strut bearing assembly for a vehicle includes: an insulator coupled to a vehicle body; a first case disposed to face the insulator; a second case rotatably coupled to the first case; a friction reduction unit disposed between the first case and the second case, and configured to reduce friction between the first case and the second case; and a coupling unit disposed in the insulator and the first case, melted by heat, and coupling the insulator and the first case to each other.

The insulator may include: a support part in which an upper cup and a lower cup are coupled to contact each other; a main plate disposed spaced apart from the support part and including a plurality of coupling holes disposed along a circumferential direction; and an attenuation part installed between the support part and the main plate, wherein the attenuation plate is elastically deformable.

The attenuation part may surround an outside of the main plate.

The first case may include one or more concave parts concavely recessed into an inside of the first case from an upper surface of the first case.

A plurality the concave parts may be arranged in a plurality of rows along a radial direction of the first case.

The first case may include a first hook protruding radially inward from an inner peripheral surface of the first case and having an end bent downward. The second case may include a second hook protruding radially inward from an inner peripheral surface of the second case and having an end bent upward. The first hook and the second hook may be engaged with each other to rotatably support the second case with respect to the first case.

The coupling unit may include: one or more first coupling parts formed through the insulator; and one or more second coupling parts extending from the first case, inserted into the one or more first coupling parts, respectively, and melt-bonded to the insulator.

A plurality of the one or more first coupling parts may be disposed spaced apart from each other along a circumferential direction of the insulator. A plurality of the one or more second coupling parts may be disposed spaced apart from each other along a circumferential direction of the first case.

Each of the one or more first coupling parts may be formed such that a width of an upper side thereof is larger than a width of a lower side thereof.

Each of the one or more second coupling parts may include: an extension portion extending to an outside of the first case and inserted into the first coupling part; and a bonding portion disposed at an end of the extension portion to be deformable in shape, and bonded to one surface of the insulator.

The bonding portion may be melted in a state in which the extension portion is inserted into the first coupling part.

The bonding portion may be deformed such that a width of the bonding portion is larger than a width of the extension portion, and the bonding portion is in contact with the one surface of the insulator.

In another general aspect, a method of manufacturing a strut bearing assembly for a vehicle includes: assembling an insulator and a first case by inserting a second coupling part into a first coupling part; melting a bonding portion by applying heat to the second coupling part; and coupling the first case and the insulator to each other by molding a molten bonding portion.

The coupling of the first case and the insulator to each other may include: pressing the molten bonding portion such that the molten bonding portion is bonded to one surface of the insulator; and cooling the molten bonding portion such that a shape of the molten bonding portion is fixed.

The first coupling part may be formed through the insulator, and the second coupling part may extend from the first case.

Other features and aspects will be apparent from the following detailed description, the drawings, and the claims.

DETAILED DESCRIPTION OF THE ILLUSTRATED EMBODIMENTS

Figure 1:
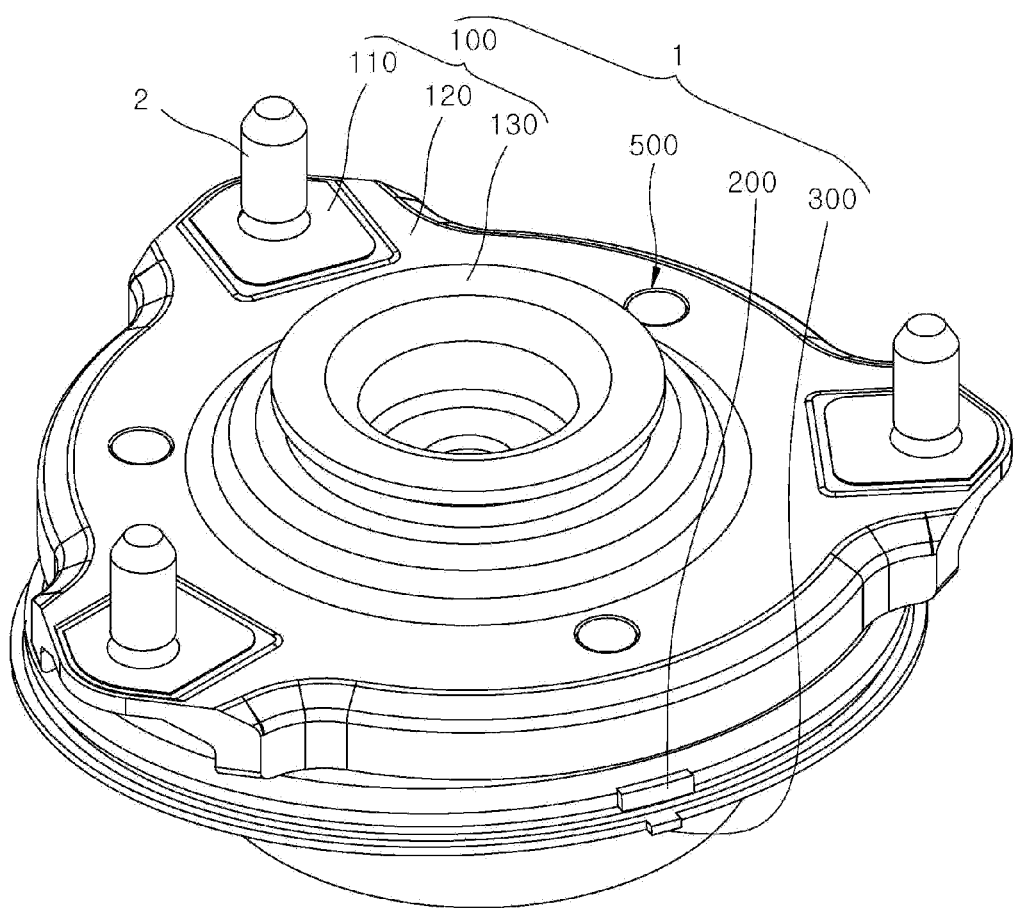
FIG. 1 is an assembled perspective view schematically illustrating a configuration of a strut bearing assembly for a vehicle in accordance with an embodiment of the present disclosure.

Hereinafter, a strut bearing assembly for a vehicle in accordance with the present disclosure will be described in detail with reference to the accompanying drawings.

In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Furthermore, in the present specification, when a certain part is referred to as being 'connected (or coupled) to' another part, it may indicate that the former part is directly connected (or coupled) to the latter part or indirectly connected (or coupled) to the latter part with another part interposed therebetween. In the present specification, when a certain part "includes (or comprises)" a certain component, it means that the element does not exclude another component but may further "include (or comprise)" another component, unless referred to the contrary.

Furthermore, substantially the same reference numerals may refer to substantially the same components throughout the present specification. Even though substantially the same reference numerals or similar reference numerals are not mentioned or described in a specific drawing, the reference numerals may be described based on other drawings. Furthermore, even though reference numerals are not indicated in a specific drawing, the reference numerals may be described based on other drawings. Furthermore, the number, shapes, and sizes of detailed components included in the drawings of the present application and relative differences in the sizes are set for convenience of understanding, and do not limit embodiments and may be implemented in various forms.

Figure 2:
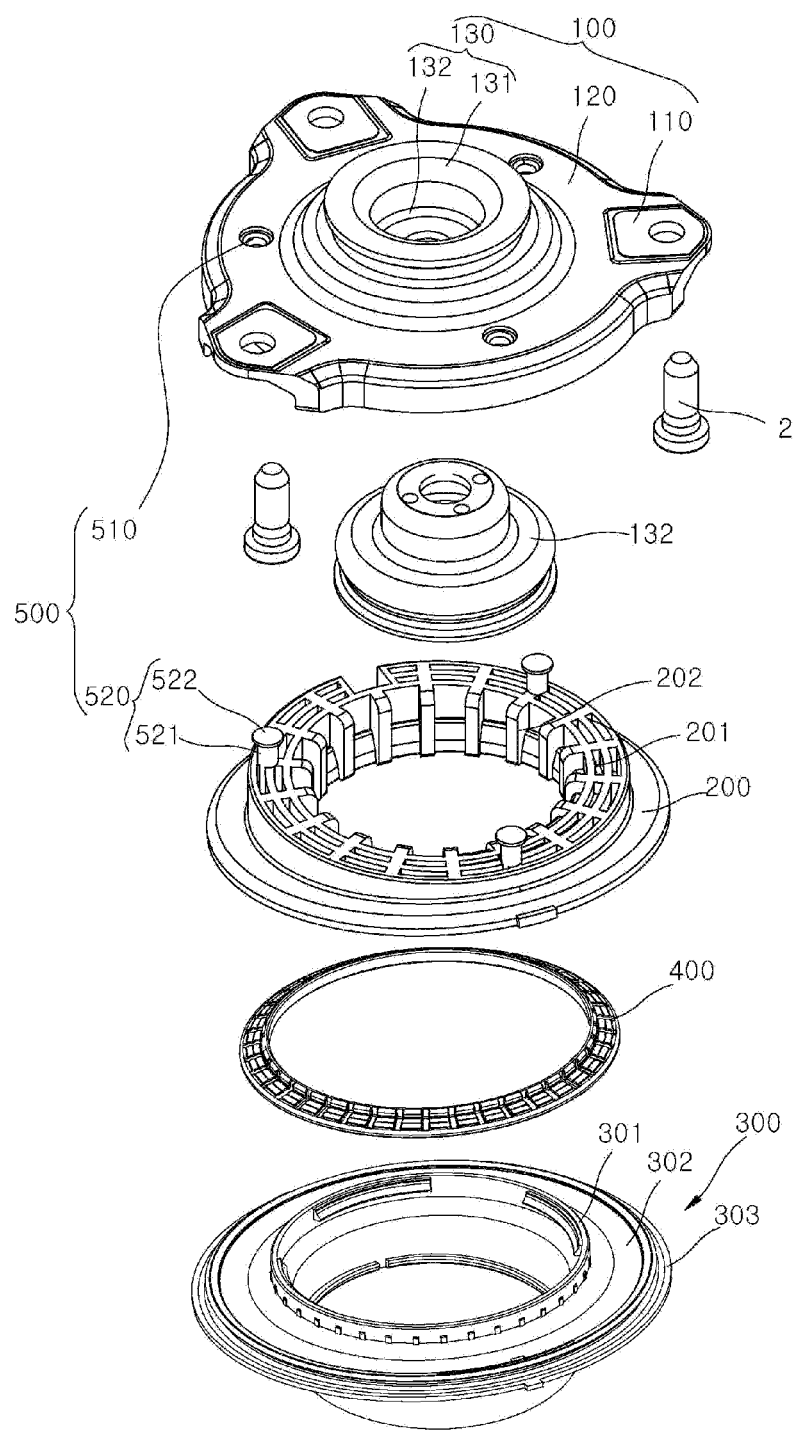
FIG. 2 is an exploded perspective view schematically illustrating the configuration of the strut bearing assembly for the vehicle in accordance with an embodiment of the present disclosure.
Figure 3:
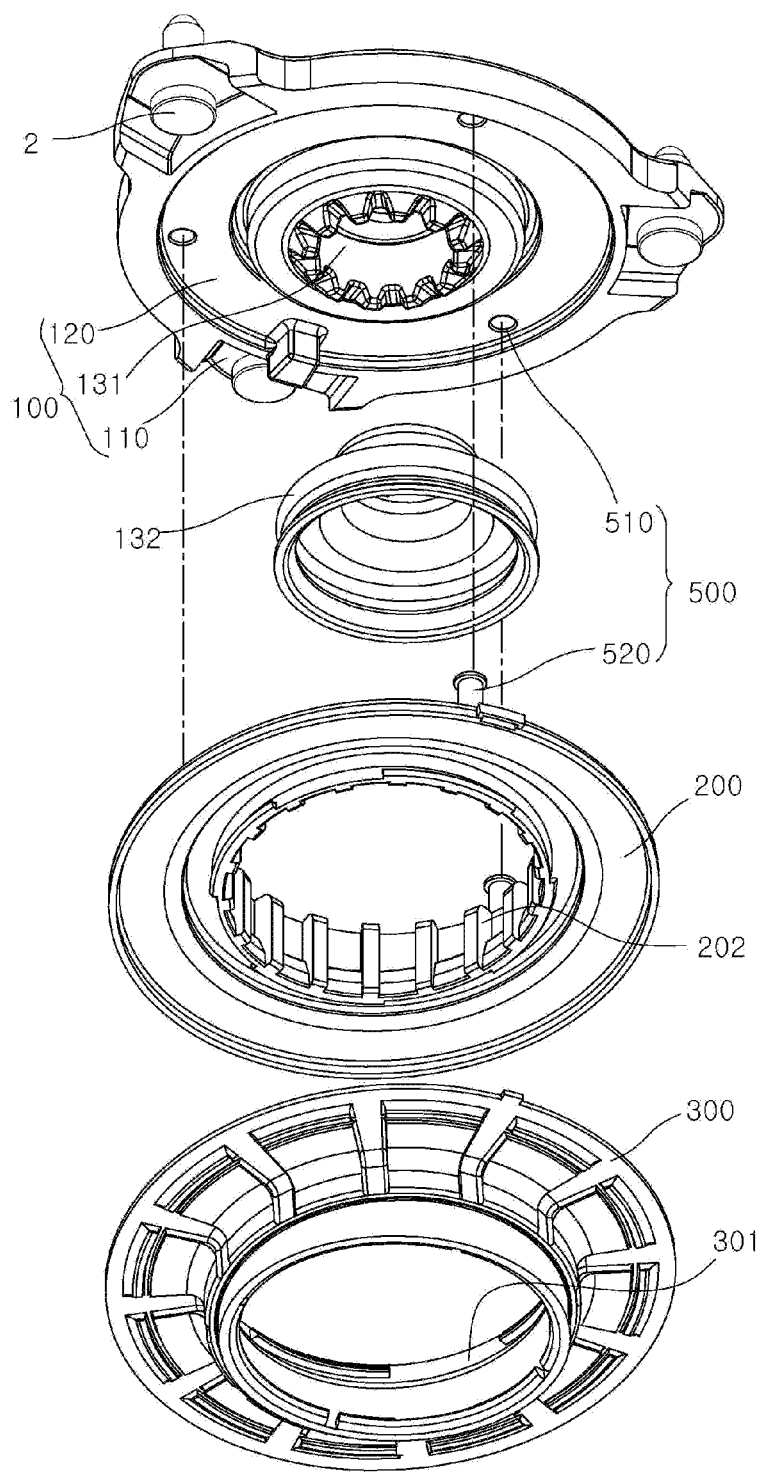
FIG. 3 is an exploded perspective view of the configuration of the strut bearing assembly for the vehicle illustrated in FIG. 2 when viewed from a different side from FIG. 2.
Figure 4:
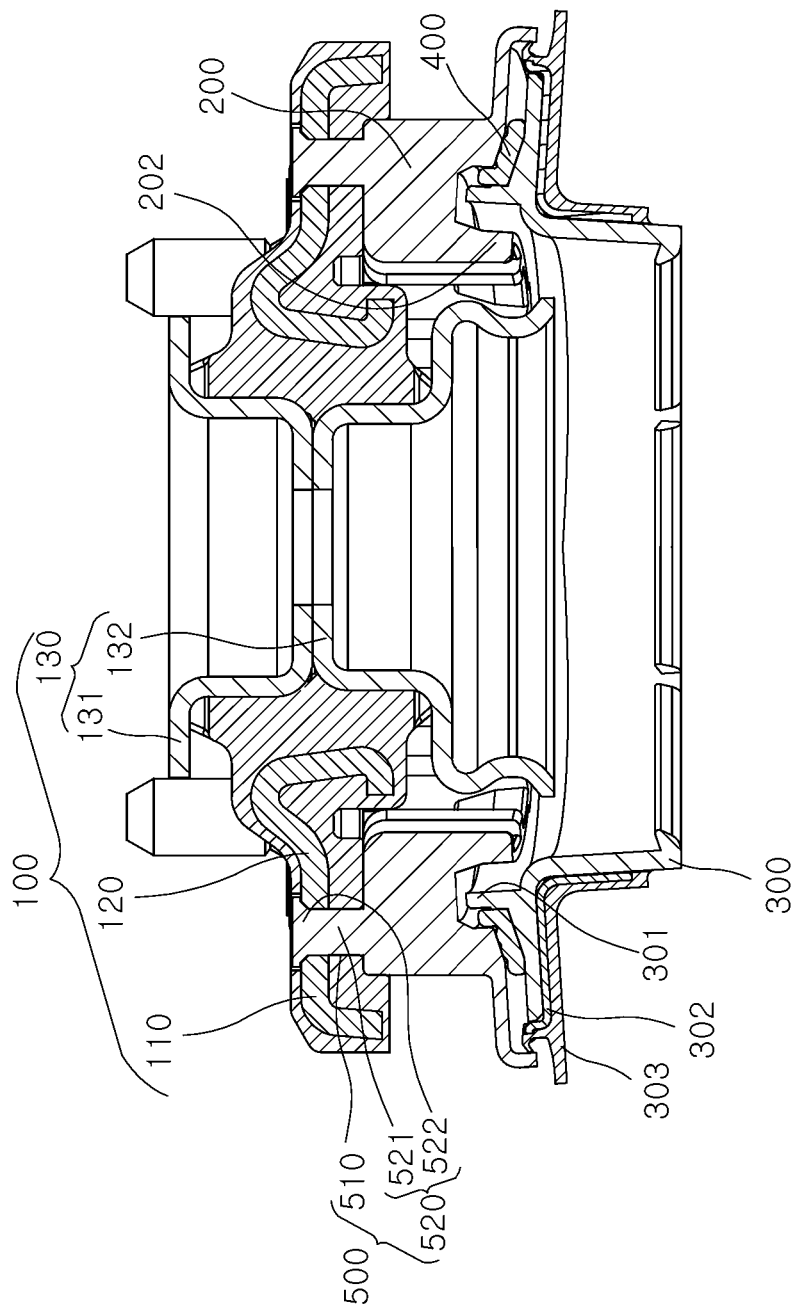
FIG. 4 is a cross-sectional view schematically illustrating the configuration of the strut bearing assembly for the vehicle in accordance with an embodiment of the present disclosure.

FIG. 1 is an assembled perspective view schematically illustrating a configuration of a strut bearing assembly 1 for a vehicle in accordance with an embodiment of the present disclosure, FIG. 2 is an exploded perspective view schematically illustrating the configuration of the strut bearing assembly 1 for a vehicle in accordance with an embodiment of the present disclosure, FIG. 3 is an exploded perspective view of the configuration of the strut bearing assembly 1 for a vehicle illustrated in FIG. 2 when viewed from a different side from FIG. 2, and FIG. 4 is a cross-sectional view schematically illustrating the configuration of the strut bearing assembly 1 for a vehicle in accordance with an embodiment of the present disclosure.

Referring to FIG. 1 to FIG. 3, the strut bearing assembly 1 for a vehicle in accordance with an embodiment of the present disclosure includes an insulator 100, a first case 200, a second case 300, a friction reduction unit 400, and a coupling unit 500.

The insulator 100 is coupled to a vehicle body and is connected to a shock absorber (not illustrated) to attenuate shock transmitted from a road surface when a vehicle is running. The insulator 100 in accordance with an embodiment of the present disclosure may include a main plate 110, an attenuation part 120, and a support part 130.

The main plate 110 is coupled to the vehicle body and forms an overall skeleton of the insulator 100. The main plate 110 may be made of a metal material such as a high-tensile steel plate to substantially maintain rigidity without being deformed even in the case of continuous vibration and shock. The main plate 110 in accordance with an embodiment of the present disclosure is disposed spaced apart from the support part 130. More specifically, the main plate 110 may be formed in a ring shape in which a hollow upper cup 131 and a hollow lower cup 132 are coupled to contact each other and surround the periphery of the support part 130 that supports the upper end of a piston rod of the shock absorber. The main plate 110 has a radially outer end that is bent downward.

The main plate 110 is formed with a plurality of coupling holes 111 that are disposed along a circumferential direction of the main plate 110 and vertically penetrate the main plate 110. The main plate 110 is fixed to the vehicle body by coupling bolts 2 inserted through the coupling holes 111. The coupling holes 111 are disposed to be exposed to the outside even after the attenuation part 120 to be described below is molded.

The attenuation part 120 is disposed between the main plate 110 and the support part 130 to integrally connect the main plate 110 and the support part 130. The attenuation part 120 is installed to surround the outside of the main plate 110. Accordingly, the attenuation part 120 may substantially prevent the main plate 110 from directly contacting the vehicle body. The attenuation part 120 may be made of an elastically deformable material such as rubber so as to absorb shock applied to the main plate 110 by an elastic restoring force. The attenuation part 120 may be manufactured in a predetermined shape by vulcanization. The vulcanization refers to both an operation of adding sulfur to raw rubber and heating the raw rubber to change elasticity and an operation of changing a plastic material into an elastic material.

The first case 200 is disposed on one side of the insulator 100, more specifically, below the insulator 100. The first case 200 is integrally coupled with the insulator 100 by the coupling unit 500 to be described below. The first case 200 may be manufactured by injection-molding a thermoplastic resin material such as plastic. The first case 200 in accordance with an embodiment of the present disclosure may be formed to have a hollow ring shape. The upper side surface of the first case 200 is disposed to face a lower side surface of the insulator 100.

The first case 200 may be formed with a plurality of concave parts 201. The concave parts 201 are concavely recessed into the inside of the first case 200 from an upper surface of the first case 200. The plurality of concave parts 201 may be disposed spaced apart from each other along the circumferential direction of the first case 200. The plurality of concave parts 201 may be arranged in a plurality of rows along the radial direction of the first case 200. The concave parts 201 expand an area where the first case 200 is in contact with the attenuation part 120. More specifically, when the first case 200 and the attenuation part 120 come into contact with each other, the concave parts 201 induce the attenuation part 120 to be depressed inwardly by elastic deformation. Accordingly, the first case 200 can be more firmly coupled to the attenuation part 120.

The first case 200 may be provided with a first hook 202. The first hook 202 may be formed in a hook shape that protrudes radially inward from an inner peripheral surface of the first case 200 and has an end bent downward. The first hook 202 may be continuously formed along the circumferential direction of the first case 200.

The second case 300 is rotatably coupled to the first case 200. The second case 300 is rotated relatively to the first case 200 during the steering operation of the vehicle and absorbs a load due to the rotational movement of the shock absorber. The second case 300 may be injection-molded including a thermoplastic resin material such as plastic. The second case 300 in accordance with an embodiment of the present disclosure is formed to have a hollow ring shape and is disposed to face the lower side surface of the first case 200.

The second case 300 may be provided with a second hook 301. The second hook 301 may be formed in a hook shape that protrudes radially inward from an inner peripheral surface of the second case 300 and has an end bent upward. The second hook 301 may be continuously formed along the circumferential direction of the second case 300. The second hook 301 is coupled to the first hook 202 to be engaged with each other by a snap-fit method, and rotatably supports the second case 300 with respect to the first case 200.

The second case 300 may further include a spring seat 302 and a spring pad 303.

The spring seat 302 is coupled to the outside of the second case 300 to reinforce the rigidity of the second case 300. Accordingly, the spring seat 302 may be made of a metal plate such as steel.

The spring pad 303 is coupled to the outside of the spring seat 302 to absorb a load applied to the second case 300. The spring pad 303 seals between the first case 200 and the second case 300. The spring pad 303 may be made of a sealing material such as silicon and rubber. The spring pad 303 may be manufactured by vulcanizing a rubber material in a state of being coupled to an outer peripheral surface of the spring seat 302.

The friction reduction unit 400 is provided between the first case 200 and the second case 300 and reduces friction between the first case 200 and the second case 300. The friction reduction unit 400 in accordance with an embodiment of the present disclosure may be exemplified as a sliding bearing in which both surfaces thereof are in surface-contact with the lower surface of the first case 200 and the upper surface of the second case 300. However, the friction reduction unit 400 is not limited thereto and may be exemplified as a rolling bearing such as a ball bearing and a roller bearing.

The coupling unit 500 is provided in the insulator 100 and the first case 200 and couples the insulator 100 and the first case 200 to each other. More specifically, the coupling unit 500 is changed in shape by hot melt molding and integrally couples the insulator 100 and the first case 200.

Figure 5:
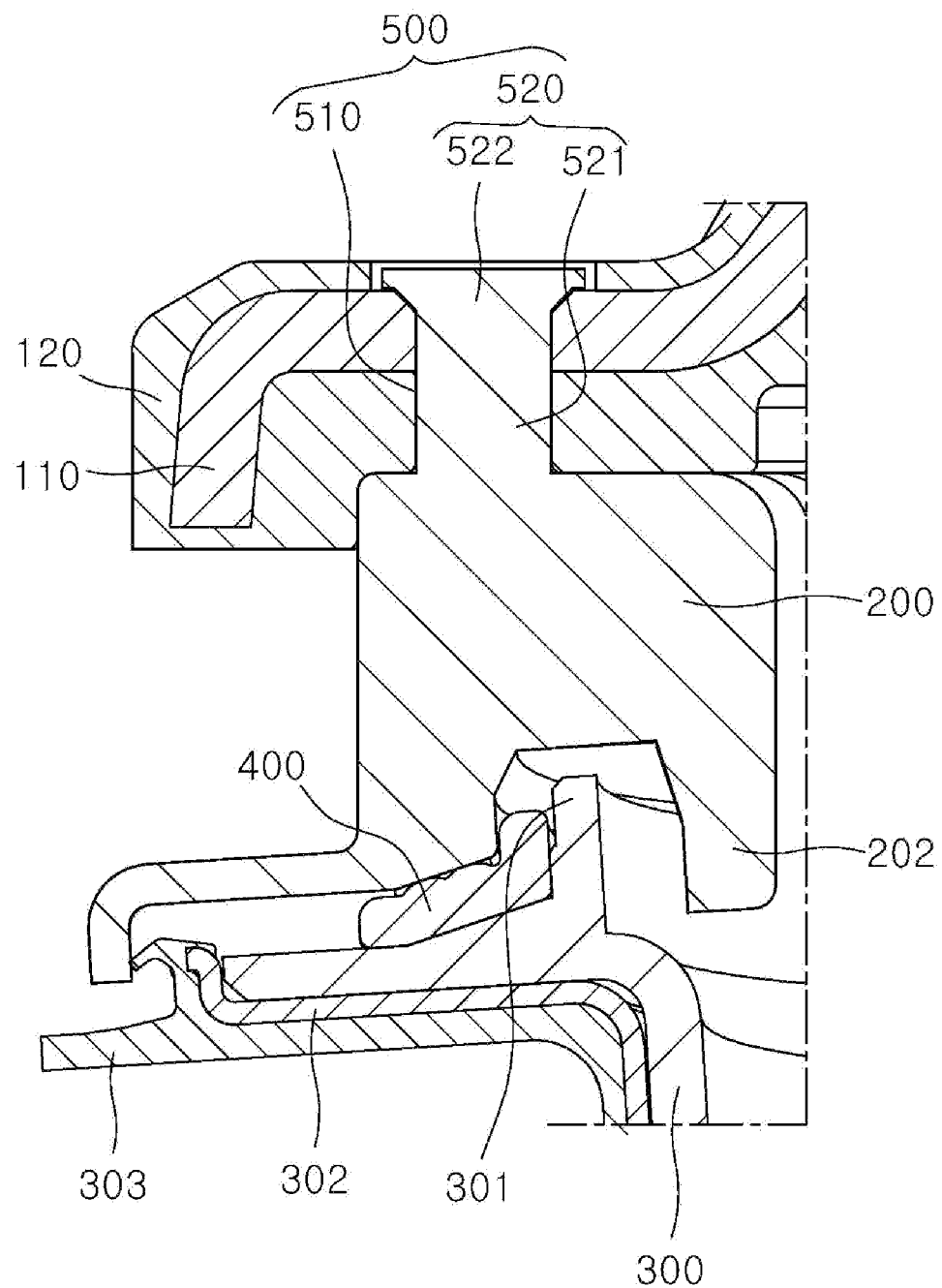
FIG. 5 is an enlarged cross-sectional view schematically illustrating the configuration of a coupling unit in accordance with an embodiment of the present disclosure.
Figure 6:
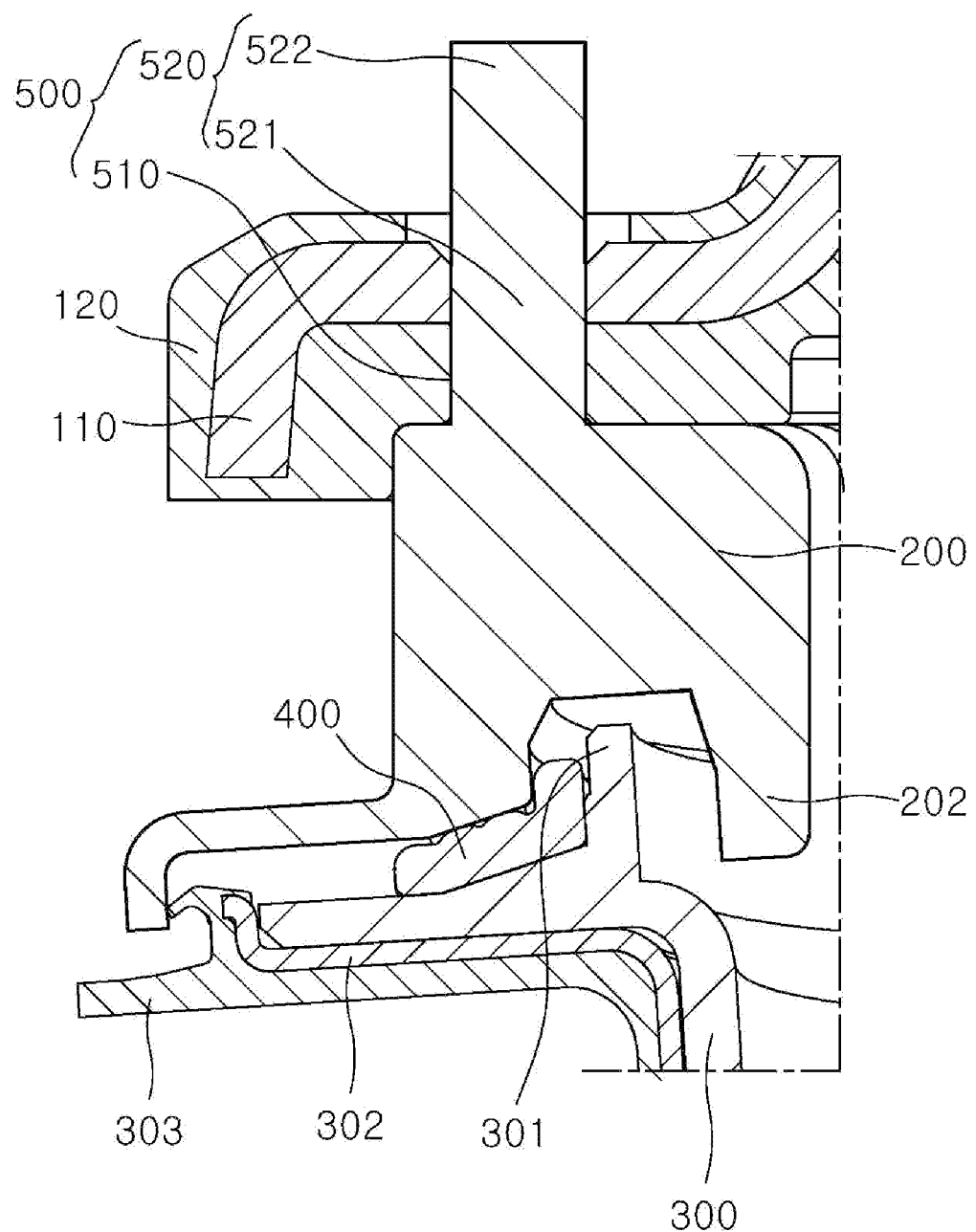
FIG. 6 to FIG. 9 are cross-sectional views schematically illustrating a manufacturing process of a manufacturing method of the strut bearing assembly for the vehicle in accordance with an embodiment of the present disclosure.
Figure 7:
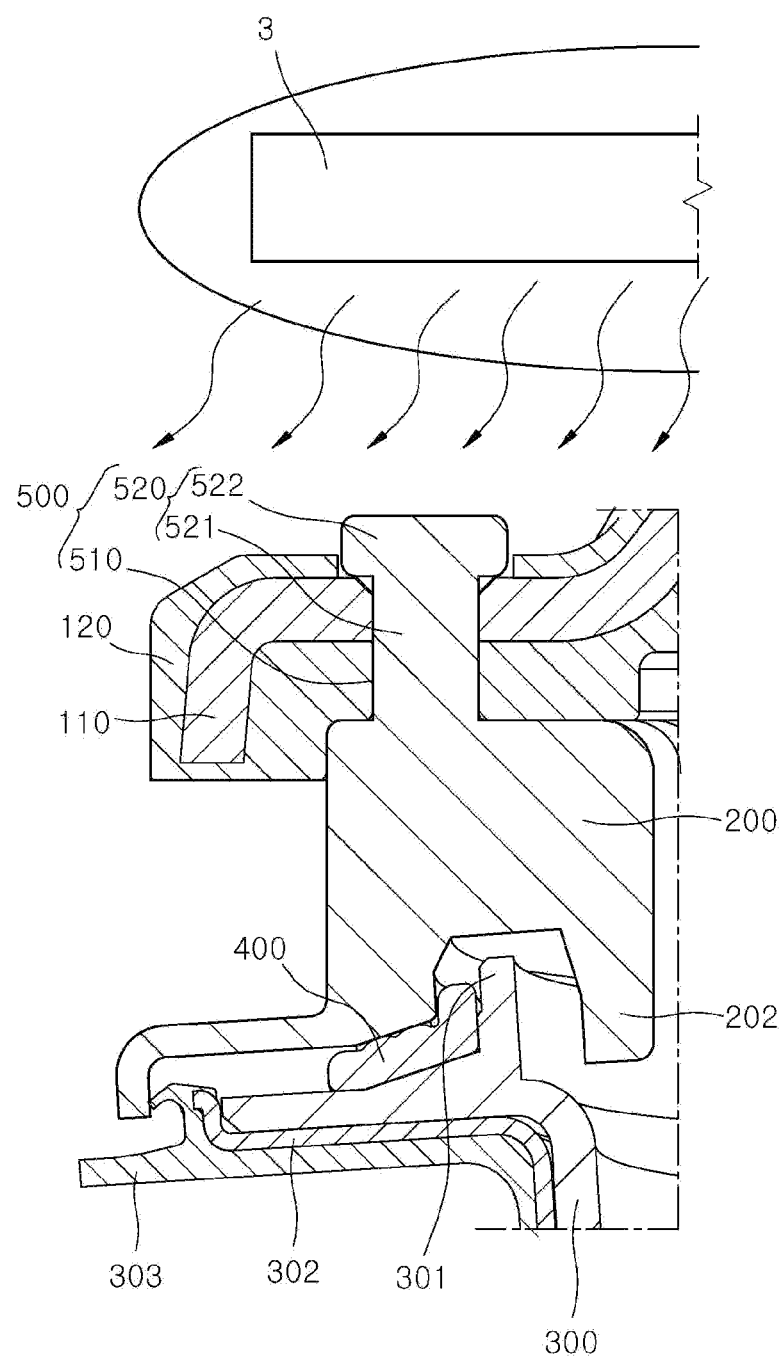
Figure 8:
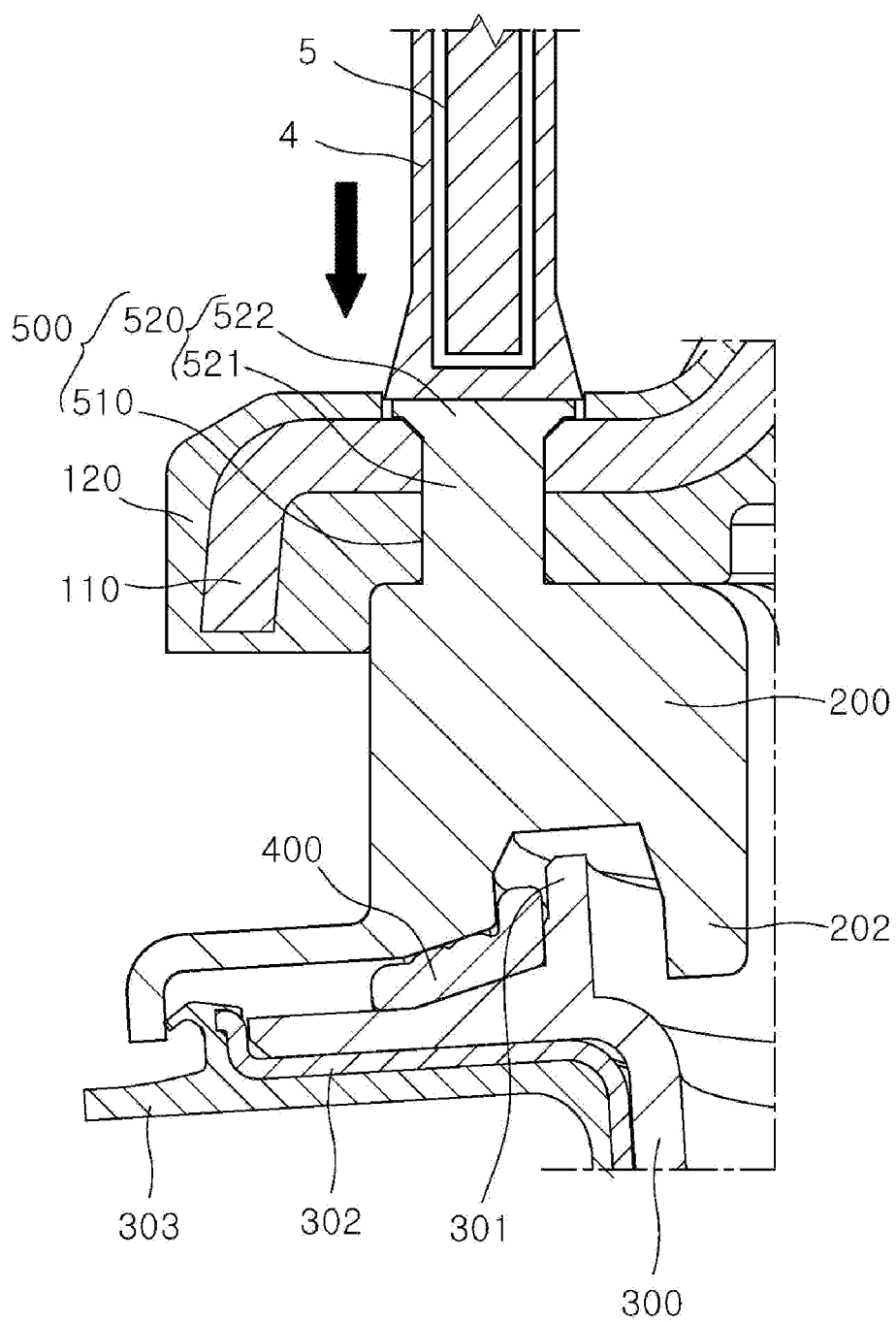
Figure 9:
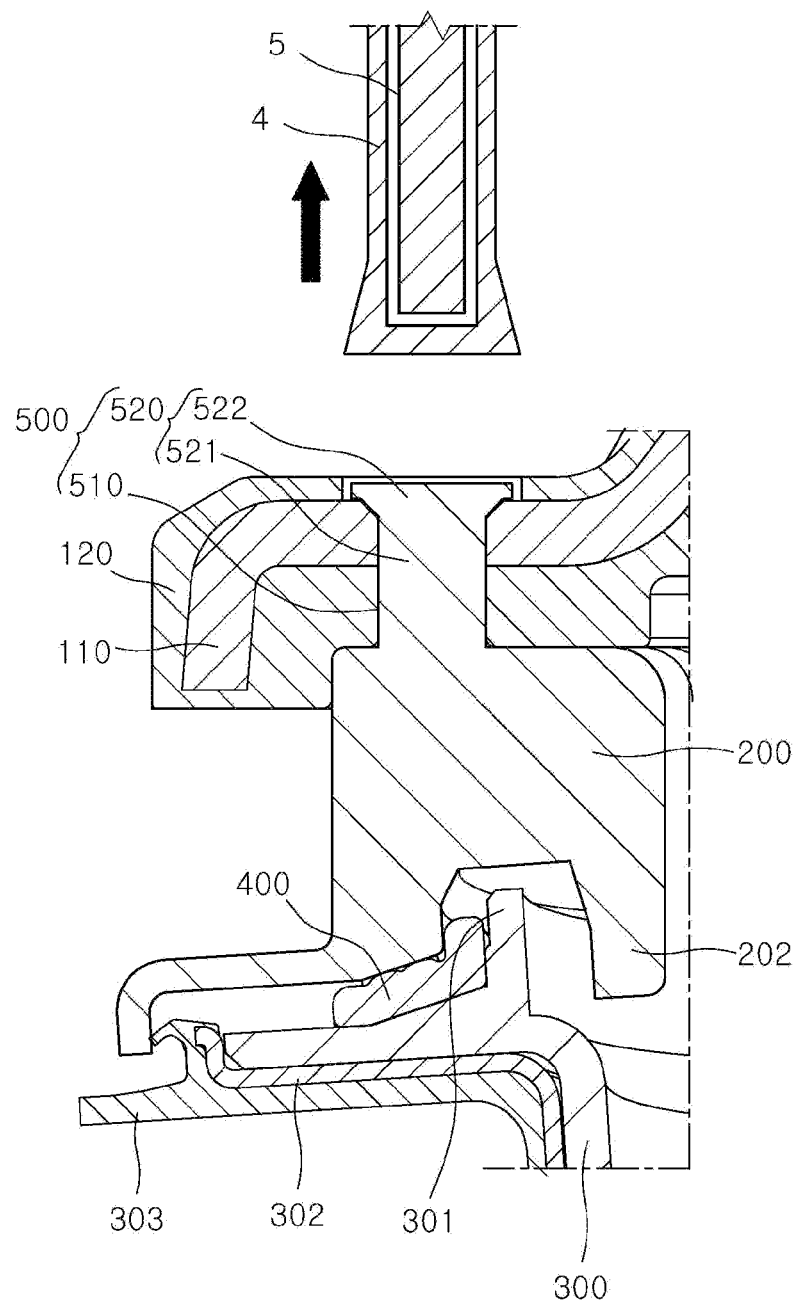

FIG. 5 is an enlarged cross-sectional view schematically illustrating the configuration of the coupling unit 500 in accordance with an embodiment of the present disclosure.

Referring to FIG. 1 to FIG. 5, the coupling unit 500 in accordance with an embodiment of the present disclosure includes a plurality of first coupling parts 510 and a plurality of second coupling parts 520.

The first coupling parts 510 are formed through the insulator 100. The first coupling parts 510 may be disposed spaced apart from each other along the circumferential direction of the insulator 100. The first coupling part 510 in accordance with an embodiment of the present disclosure is formed in the form of a hole that vertically penetrates the main plate 110 and the attenuation part 120 provided in the insulator 100 at the same time. The first coupling part 510 is formed so that the upper side thereof has a width larger than that of the lower side thereof, and exposes the upper side surface of the main plate 110 to the outside. Accordingly, the first coupling parts 510 may allow the second coupling part 520 to be described below to be directly bonded to the main plate 110.

The second coupling parts 520 extend from the first case 200 and are inserted into the first coupling parts 510, respectively. The second coupling parts 520 are melt-bonded to the insulator 100 as heat is applied thereto. The second coupling parts 520 may be provided along the circumferential direction of the first case 200. In such a case, the second coupling parts 520 are disposed at positions corresponding to the first coupling parts 510. The second coupling part 520 may include a thermoplastic resin material so that melting by heat may easily occur.

Each of the second coupling parts 520 in accordance with an embodiment of the present disclosure includes an extension portion 521 and a bonding portion 522.

The extension portion 521 extends to the outside of the first case 200 and is inserted into the first coupling part 510. The extension portion 521 in accordance with an embodiment of the present disclosure is formed in the form of a rod having a circular section. The extension portion 521 may have a diameter corresponding to or smaller than that of the first coupling part 510. As the extension portion 521 is integrally injection-molded with the first case 200, a lower end of the extension portion 521 may be integrally connected to the upper side surface of the first case 200.

The bonding portion 522 is provided at an end of the extension portion 521 to be deformable in shape. The bonding portion 522 is changed in shape by hot melt molding after the extension portion 521 is inserted into the first coupling part 510, and is bonded to one surface of the insulator 100, more specifically, the upper side surface of the main plate 110. More specifically, the bonding portion 522 is melted by heat applied from a heating module 3 in the state in which the extension portion 521 has been inserted into the first coupling part 510. Then, the bonding portion 522 is changed in shape to have a width larger than that of the extension portion 521 by pressing force applied from a pressing module 4. Accordingly, the bonding portion 522 may solve a problem of assembly failure due to different dimensions between components, and may be locked to the upper side surface of the main plate 110 to substantially prevent the extension portion 521 from being separated from the first coupling part 510.

Hereinafter, a manufacturing method of the strut bearing assembly 1 for a vehicle in accordance with an embodiment of the present disclosure will be described.

Figure 10:
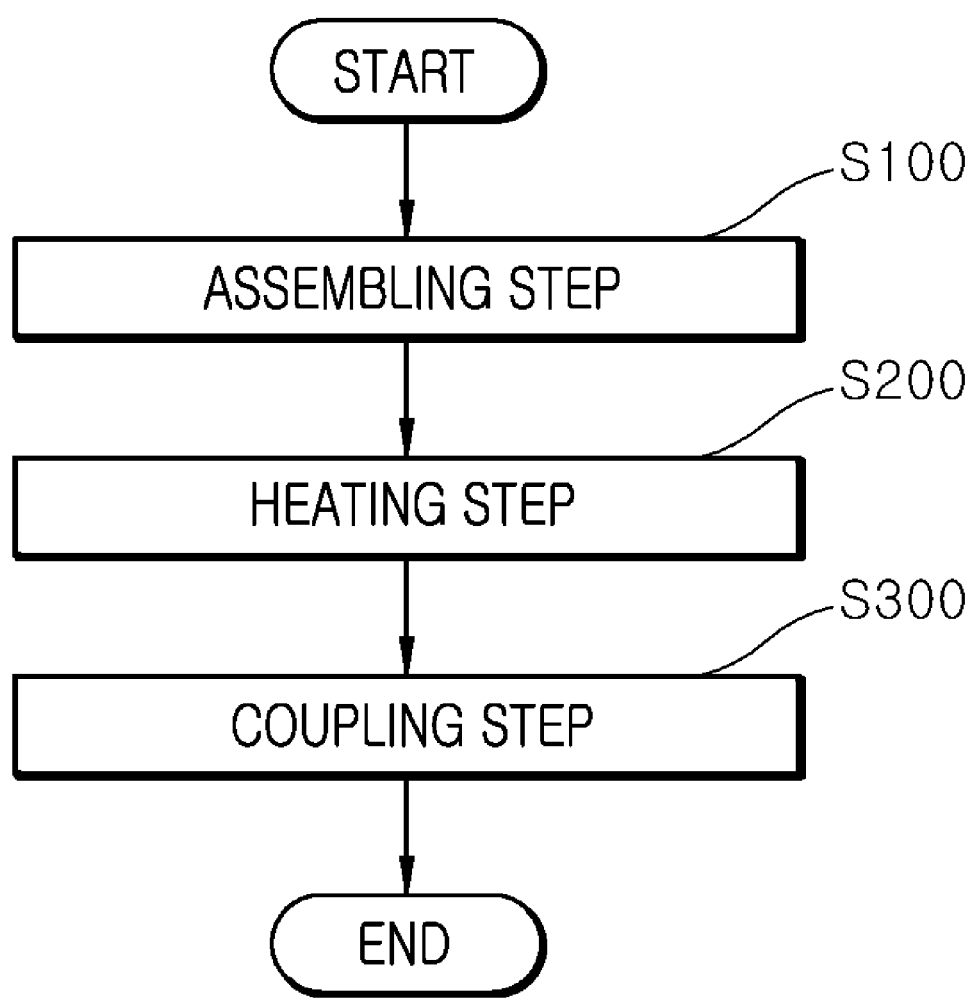
FIG. 10 is a flowchart schematically illustrating the sequence of the manufacturing method of the strut bearing assembly for the vehicle in accordance with an embodiment of the present disclosure.

FIG. 6 to FIG. 9 are cross-sectional views schematically illustrating a manufacturing process of a manufacturing method of the strut bearing assembly 1 for a vehicle in accordance with an embodiment of the present disclosure, and FIG. 10 is a flowchart schematically illustrating the sequence of the manufacturing method of the strut bearing assembly 1 for a vehicle in accordance with an embodiment of the present disclosure.

Referring to FIG. 6 to FIG. 10, the manufacturing method of the strut bearing assembly 1 for a vehicle in accordance with an embodiment of the present disclosure includes an assembling step S100, a heating step S200, and a coupling step S300.

The assembling step S100 is a step of assembling the insulator 100 and the first case 200. The process of the assembling step S100 in accordance with an embodiment of the present disclosure will be described in more detail. First, the lower side surface of the insulator 100 and the upper side surface of the first case 200 are disposed to face each other.

The insulator 100 and the first case 200 are relatively rotated to allow the second coupling parts 520 to be in alignment with the first coupling parts 510.

The second coupling parts 520 are inserted into the first coupling parts 510 to assemble the insulator 100 and the first case 200. In such a case, as the bonding portion 522 is injection-molded to have substantially the same diameter as that of the extension portion 521 that is not melted, the second coupling parts 520 may be easily inserted into the first coupling parts 510

The heating step S200 is a step of melting the bonding portions 522 by applying heat to the second coupling parts 520. The heating step S200 in accordance with an embodiment of the present disclosure may be performed by the heating module 3, which generates heat, in the state in which the insulator 100 and the first case 200 have been assembled in the assembling step S100. The bonding portions 522 melted by the heating module 3 becomes freely deformable in shape due to the weakened bonding between molecules because it includes a thermoplastic resin material.

The heating module 3 may be exemplified as any one of various heating devices that generate heat using a combustion reaction, light, and the like. Meanwhile, as the heating module 3 is disposed to face the bonding portion 522 protruding to the upper part of the insulator 100, the components such as the first coupling part 510 and the second case 300 other than the bonding portion 522 may be substantially prevented from being melted. The temperature and time at which the heating module 3 melts the bonding portion 522 may be changed in design to various temperatures and times according to the standard, material, and the like of the bonding portion 522.

The coupling step S300 is a step of coupling the first case 200 and the insulator 100 by molding the molten bonding portion 522. The coupling step S300 may be performed by the pressing module 4 in which a cooling module 5 is installed.

The pressing module 4 is disposed above the insulator 100 and is provided to be vertically movable up and down. A lower end of the pressing module 4 is in contact with the upper end of the molten bonding portion 522 to press the molten bonding portion 522 in a direction toward the insulator 100. The lower end of the pressing module 4 may have a width corresponding to that of the upper side of the first coupling part 510.

The cooling module 5 is formed in a tubular shape to provide a fluid path, through which a cooling fluid such as water may flow, in the pressing module 4.

Figure 11:
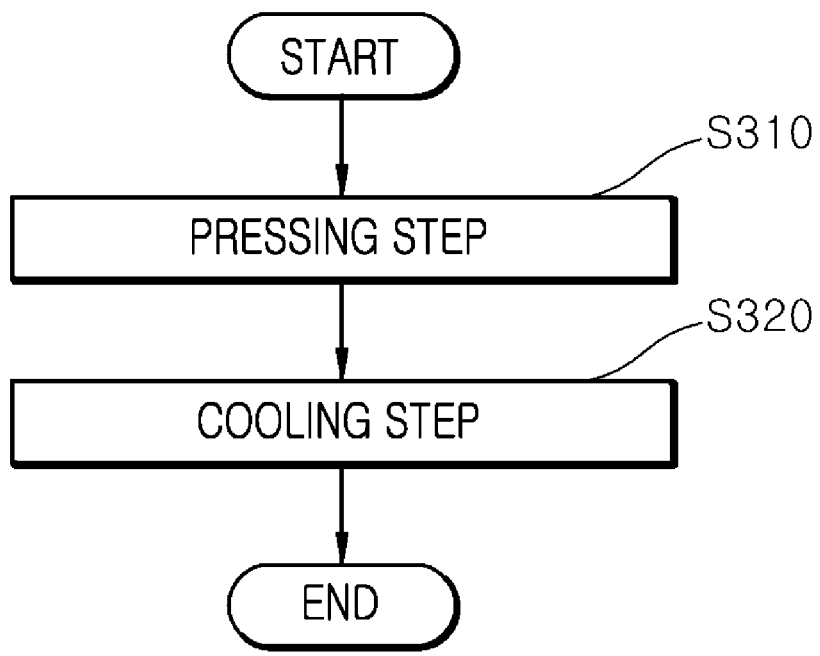
FIG. 11 is a flowchart schematically illustrating the sequence of a coupling step in accordance with an embodiment of the present disclosure.

FIG. 11 is a flowchart schematically illustrating the sequence of the coupling step S300 in accordance with an embodiment of the present disclosure.

The coupling step S300 in accordance with an embodiment of the present disclosure includes a pressing step S310 and a cooling step S320.

The pressing step S310 is a step of pressing the molten bonding portion 522 by the pressing module 4 so that the molten bonding portion 522 is bonded to one surface of the insulator 100.

The process of the pressing step S310 in accordance with an embodiment of the present disclosure will be described in more detail. First, the pressing module 4 is moved downward to press the upper side surface of the bonding portion 522 molten in the heating step S200.

By the pressing force of the pressing module 4, the bonding portion 522 is compressed into a disc shape and is changed in shape.

The bonding portion 522 is deformed to form a substantially "T" shape with the extension portion 521, and the lower side surface of the bonding portion 522 is in close contact with the upper side surface of the insulator 100.

As the first coupling part 510 is formed so that the upper side thereof has a width larger than that of the lower side thereof, the bonding portion 522 may be in direct close contact with the upper side surface of the main plate 110.

The cooling step S320 is a step of cooling the bonding portion 522 by the cooling module 5 so that the shape of the bonding portion 522 is fixed.

The process of the cooling step S320 in accordance with an embodiment of the present disclosure will be described in more detail. The cooling fluid flows into the cooling module 5 in the state in which the pressing module 4 is in contact with the bonding portion 522 in the pressing step S310.

The cooling fluid flowing through the cooling module 5 passes through the lower end of the pressing module 4 and absorbs the heat of the bonding portion 522 by head conduction. Accordingly, the bonding portion 522 is fixed in shape and is bonded to the insulator 100, more specifically, the upper side surface of the main plate 110.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments.

Thus, the true technical scope of the present disclosure should be defined by the following claims.

What is claimed is:

1. A strut bearing assembly for a vehicle, comprising:
   an insulator coupled to a vehicle body;
   a first case disposed to face the insulator;
   a second case rotatably coupled to the first case;
   a friction reduction unit disposed between the first case and the second case, and configured to reduce friction between the first case and the second case; and
   a coupling unit disposed in the insulator and the first case, melted by heat, and coupling the insulator and the first case to each other,
   wherein the insulator includes:
   a support part in which an upper cup and a lower cup are coupled to contact each other;
   a main plate disposed spaced apart from the support part and including a plurality of coupling holes disposed along a circumferential direction; and
   an attenuation part installed between the support part and the main plate, wherein the attenuation part is elastically deformable.

2. The strut bearing assembly according to claim 1, wherein the attenuation part surrounds an outside of the main plate.

3. The strut bearing assembly according to claim 1, wherein the first case includes one or more concave parts concavely recessed into an inside of the first case from an upper surface of the first case.

4. The strut bearing assembly according to claim 3, wherein a plurality the concave parts are arranged in a plurality of rows along a radial direction of the first case.

5. The strut bearing assembly according to claim 1, wherein the first case includes a first hook protruding radially inward from an inner peripheral surface of the first case and having an end bent downward,
   wherein the second case includes a second hook protruding radially inward from an inner peripheral surface of the second case and having an end bent upward, and
   wherein the first hook and the second hook are engaged with each other to rotatably support the second case with respect to the first case.

6. The strut bearing assembly according to claim 1, wherein the coupling unit includes:
   one or more first coupling parts formed through the insulator; and
   one or more second coupling parts extending from the first case, inserted into the one or more first coupling parts, respectively, and melt-bonded to the insulator.

7. The strut bearing assembly according to claim 6, wherein a plurality of the one or more first coupling parts are disposed spaced apart from each other along a circumferential direction of the insulator, and a plurality of the one or more second coupling parts are disposed spaced apart from each other along a circumferential direction of the first case.

8. The strut bearing assembly according to claim 6, wherein each of the one or more first coupling parts is formed such that a width of an upper side thereof is larger than a width of a lower side thereof.

9. The strut bearing assembly according to claim 6, wherein each of the one or more second coupling parts includes:
   an extension portion extending to an outside of the first case and inserted into the one or more first coupling parts, respectively; and
   a bonding portion disposed at an end of the extension portion to be deformable in shape, and bonded to one surface of the insulator.

10. The strut bearing assembly according to claim 9, wherein the bonding portion is melted in a state in which the extension portion is inserted into the first coupling parts.

11. The strut bearing assembly according to claim 10, wherein the bonding portion is deformed such that a width of the bonding portion is larger than a width of the extension portion, and the bonding portion is in contact with the one surface of the insulator.

12. A method of manufacturing a strut bearing assembly for a vehicle, the method comprising:
   assembling an insulator and a first case by inserting a second coupling part into a first coupling part;
   melting a bonding portion by applying heat to the second coupling part; and
   coupling the first case and the insulator to each other by molding a molten bonding portion,
   wherein the insulator includes:
   a support part in which an upper cup and a lower cup are coupled to contact each other;
   a main plate disposed spaced apart from the support part and including a plurality of coupling holes disposed along a circumferential direction; and
   an attenuation part installed between the support part and the main plate, wherein the attenuation part is elastically deformable.

13. The method according to claim 12, wherein the coupling of the first case and the insulator to each other includes:
   pressing the molten bonding portion such that the molten bonding portion is bonded to one surface of the insulator; and
   cooling the molten bonding portion such that a shape of the molten bonding portion is fixed.

14. The method of claim 12, wherein the first coupling part is formed through the insulator, and the second coupling part extends from the first case.

* * * * *